March 2, 1954  L. H. FLORA  2,670,512
MOLDING CLIP

Filed June 16, 1952  2 Sheets-Sheet 1

INVENTOR
LAURENCE H. FLORA

BY H. J. Lombard
ATTORNEY

March 2, 1954 — L. H. FLORA — 2,670,512
MOLDING CLIP
Filed June 16, 1952 — 2 Sheets-Sheet 2
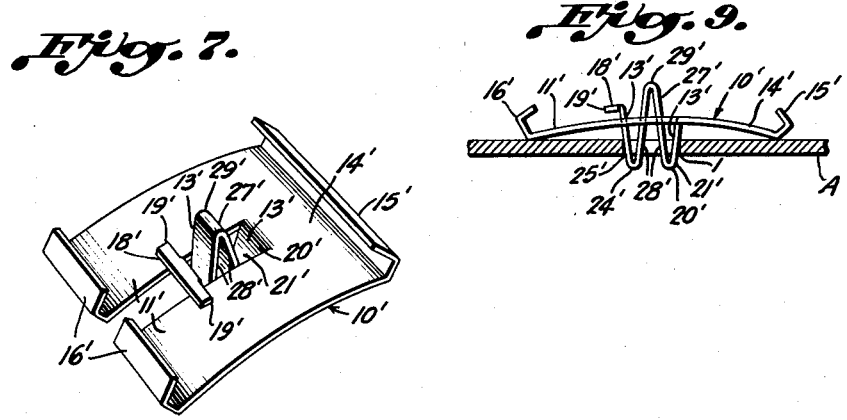
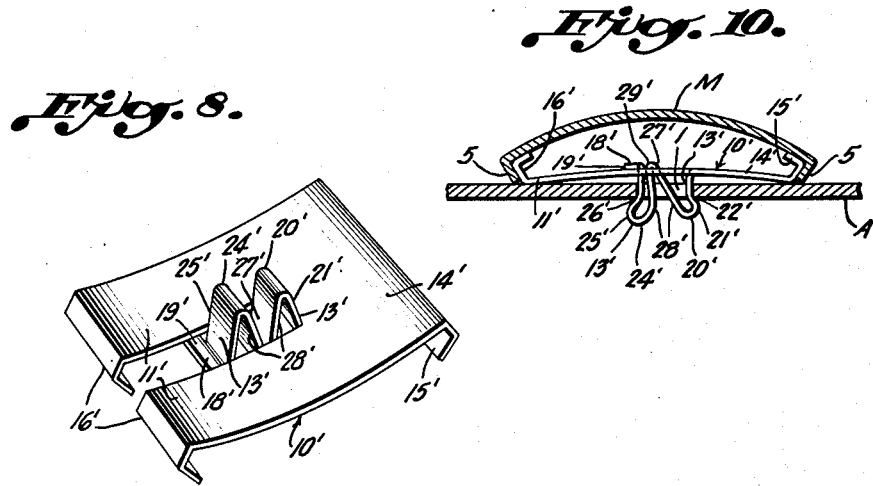
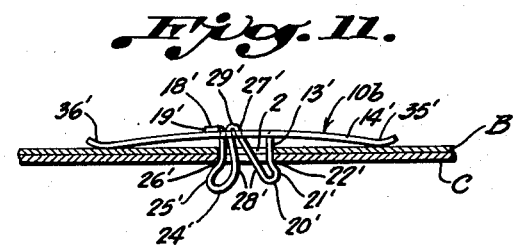
INVENTOR
LAURENCE H. FLORA
BY
ATTORNEY Patented Mar. 2, 1954

2,670,512

UNITED STATES PATENT OFFICE 2,670,512

MOLDING CLIP

Laurence H. Flora, Cleveland, Ohio, assignor to Tinnerman Products, Inc., Cleveland, Ohio, a corporation of Ohio Application June 16, 1952, Serial No. 293,726

2 Claims. (Cl. 24—73)

This invention relates to installations for moldings, trim strips, and the like, and deals, more particularly, with an improved construction for clips or fasteners which are used to secure the moldings or trim strips onto a supporting surface by a simple operation taking place entirely from the accessible side only of the supporting surface. The clip of the invention, otherwise, is a fastener of general utility in that the securing elements thereof are adapted to be readily secured in a work opening in a plate, panel or two or more parts to be secured in a wide range and variety of applications and uses.

The clip or fastener is of the general character which comprises a head or base and an expansible shank composed of cooperating yieldable elements depending from said base which are receivable in a work opening and expanded in secured relation in the work opening under the driving force of a special tool or otherwise expanded by an equivalent driving force applied directly to said shank elements of the clip. A primary object of the invention is to provide such a fastener in the form of a simple low cost clip, or the like, which is readily constructed from a relatively small, inexpensive blank of sheet metal with the body of the blank defining the head or base of the clip and with the shank provided from said body of the blank in the form of an integral W-shaped strip defining a loop projecting upwardly above the fastener base intermediate a pair of loop elements below the fastener base adapted to be expanded into secured relation in a work opening under driving force applied to said upwardly projecting loop.

A further object of the invention is to provide such a clip wherein the shank thereof comprises a W-shaped strip that is stamped from the body of the sheet metal blank with one end of said strip integral with said body and the other end extending free and positively interconnected to said body in a strong and reliable construction which insures a proper application and securing action of the clip in applied fastening position.

A further object of the invention is to provide a clip or fastener of this character wherein the free end of the W-shaped strip forming the shank is provided with a T-shaped extremity which is interconnected to the head or base of the clip in a manner capable of withstanding any force tending to separate the same from the head of the clip either in application of the fastener or incidental to its use in applied position in an installation.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which.

Figure 3:
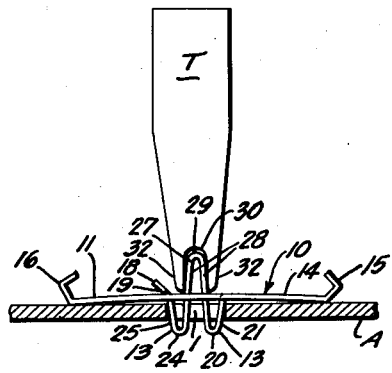
Fig. 3 shows the fastener of Figs. 1 and 2 in edge elevation as initially assembled in a panel opening preparatory to the operation for securing the fastener under the impact of a driving force on a tool shown fitted in driving position on the fastener.
Figure 4:
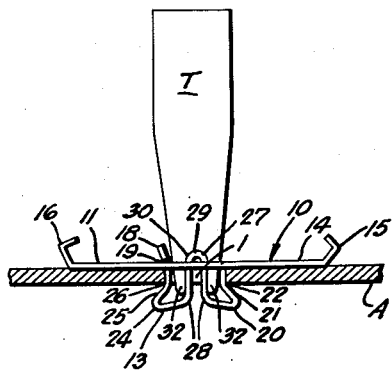
Fig. 4 is a similar view showing the fastener as secured in the panel opening after a driving force on the tool.
Figure 6:
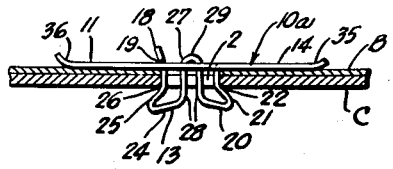
Figure 5:
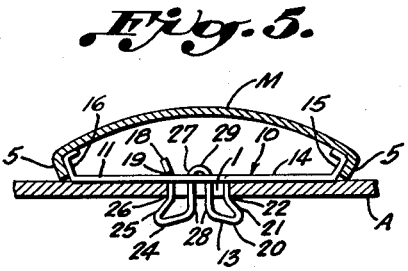

Fig. 5 shows the fastener in a view similar to Fig. 4 with the tool removed, and a molding, illustrated in section, as attached in mounted position by springing the side flanges of the molding over arm portions provided on the head or base of the fastener; and, Fig. 6 shows a fastener similar to that of Figs. 1–5, inclusive, as provided in the form of a simple clip which is readily anchored in a work opening in two or more parts to be secured.

Figure 1:
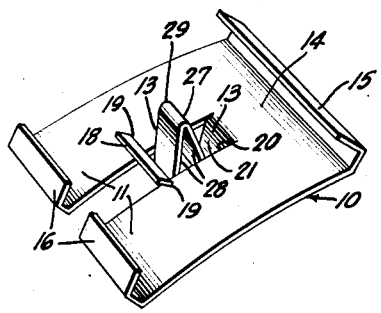
Fig. 1 is a perspective view of a fastener in accordance with the invention as seen from the upper side of the head or base thereof, the fastener being provided in the form of a clip for attaching a molding or other channel shaped object to a supporting part.

Fig. 7 is a perspective view of an alternate form of molding clip as seen from the upper side of the head or base thereof, this form of the fastener having a modified formation by which direct hammer blows or the like, secure the same in a work opening;

Fig. 8 is a perspective view of the clip of Fig. 1 as seen from the underside of the head or base thereof;

Fig. 9 shows the fastener of Figs. 7 and 8 in edge elevation as initially assembled in a panel opening preparatory to the operation for securing the fastener in final position;

Fig. 10 is a similar view showing the fastener as secured in final position in a work opening and a molding, illustrated in section, as attached in mounted position by springing the side flanges of the molding over arm portions provided on the head or base of the fastener; and, Fig. 11 shows a fastener similar to that of Figs. 7–10, inclusive, as provided in the form of a simple clip which is readily anchored in a work opening in two or more parts to be secured.

Figure 2:
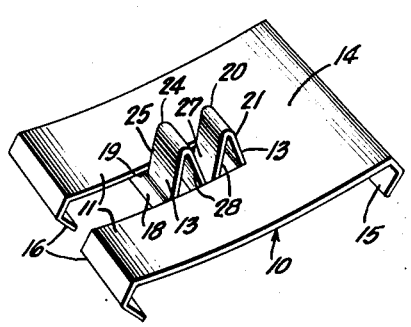
Fig. 2 is a perspective view of the clip of Fig. 1 as seen from the underside of the head or base thereof.

Referring now, more particularly, to the drawings, Figs. 1 and 2 show a preferred form of clip or fastener in accordance with the invention which is applied and secured in a work opening 1 in a supporting part A by a tool as illustrated in Figs. 3 and 4 in position for mounting a molding or other channel-shaped object on the supporting part A, substantially as shown in Fig. 5.

The supporting part A is usually in the form of a plate or panel, or the like, and is provided with a series of openings 1 in spaced relation along the path which the molding is to extend in mounted position. The panel A may be of any suitable metal, wood or fibre board material and the openings 1 therein may be round, rectangular or of any other suitable outline, but generally are provided in the manner of circular holes which involve the least cost inasmuch as only the simplest punching or drilling tools are required.

The clip or fastener, designated generally 10, Figs. 1–5, inclusive, is a simple inexpensive article of manufacture which is readily constructed from any suitable sheet metal material, preferably spring metal such as spring steel or cold rolled steel having spring-like characteristics. The devices may be formed from blanks of various outlines, of course, but from a quantity production standpoint, are most advantageously provided from a comparatively small, generally rectangular blank which may be obtained from ordinary sheet metal strip stock with little loss or waste of material.

The sheet metal blank or body defines the head or base of the clip or fastener 10 and is provided with a pair of spaced parallel longitudinal slits defining a pair of spaced head sections 11 on opposite sides of a central strip 13 which is joined to said head sections 11 by an imperforate head or base portion 14 at one end of the blank. The imperforate portion 14 has the end thereof bent upwardly to provide an arm 15 while the opposite ends of the spaced head sections 11 are both bent upwardly to provide similar arm portions 16. The upwardly bent portions 15, 16, are in the nature of spring arms defining cam surfaces which are adapted to be sprung or snapped into engagement with the opposite flanges or surfaces of a channel or recess in an object to be mounted such as a molding, trim strip, or the like.

The head or base of the fastener composed of the spaced head sections 11 and imperforate portion 14, preferably is provided in a generally arched or bowed formation generally longitudinally thereof such that the arched or bowed base thus provided is adapted to flex and thereby resiliently engage the supporting panel A under tension in the final, applied position of the fastener.

The free end of the strip 13 terminates in a T-shaped tongue 18 providing oppositely extending lateral projections 19 on the extremity of said strip 13. The inner end of said strip 13 is integral with the imperforate base portion 14 and extends therefrom in a generally W-shaped formation. The free end portion of said strip 13 extends upwardly through the space between the spaced head sections 11 with the T-shaped extremity 18 of said free end disposed at the upper side of said head sections in interconnected relation therewith. The oppositely extending lateral projections 19 overlap the adjacent edge portions of said head sections 11 for bearing engagement therewith, particularly in the final, applied position of the fastener. Preferably, the T-shaped extremity 18 extends substantially edgewise with respect to the head sections 11 with the lower edges of the projections 19 bearing on the adjacent edge portions of said head sections 11 in overlapping relation therewith such that the free end of said strip 13 is united to the head or base of the fastener in a strong and durable connection.

The strip 13 is bent between its ends in a generally W-shaped formation to provide a shank comprising a pair of similar lower loops 20, 24, projecting downwardly from the underside of the head or base 11 of the fastener and an intermediate upper loop 27 projecting upwardly from the upper side of said head or base 11. The strip portions of the fastener forming the loops 20, 24, 27 are all disposed in the slot between the spaced head sections 11 and the arrangement is such that the loop 20 is formed with an outer leg member 21 depending integrally from the imperforate head or base portion 14 and which is return bent to define the upwardly extending loop 27 comprising a pair of inner legs 28 in the form of an inverted U-shape having its apex 29 materially above the head or base 11 of the fastener. The remaining portion of the strip 13 is formed in a return bend providing the other lower loop 24 having an outer leg 25 which carries the T-shaped extremity 18 extending upwardly through the space between the spaced head sections 11 in interconnected relation therewith, as aforesaid.

The fastener thus provided appears substantially as seen in Figs. 1 and 2, and in securing the same to the panel or other support A, the fastener is initially applied as shown in Fig. 3 with the lower loops 20 and 24 received in and projecting through the work opening 1 in the panel or other support A. In this initially applied position, the fastener is untensioned and the arched or bowed formation of the head or base 11 extends in concave relation slightly above the upper surface of the panel A as seen in Fig. 3.

The intermediate loop 27 projects materially above the head or base 11 of the fastener in suitable position for the application of a driving force thereto to deform the lower portions of the legs 28 thereof and the adjoining portions of the lower loops 20, 24 to secure the fastener in the panel opening 1. In this form of the invention, a tool T, Figs. 3 and 4, is employed to transmit such driving force to the intermediate loop 27 in what may be termed a combined driving and bending action. The tool T may be either a manual or machine device and is provided on its leading end with a recess 30 between a pair of spaced chisel-like points 32. The recess 30 corresponds substantially to the formation of the intermediate loop 27 of the fastener so as to snugly fit the same in providing for a firm, rigid engagement therewith in the driving operation. The spaced points 32 are of a predetermined length less than the length of the leg members 28 of said intermediate loop 27 so that the extremities of said points 32 serve as anvils over which said leg members 28 will bend outwardly beyond the extremities of said points 32. The spaced points 32 otherwise are of a suitable thickness to wedge the outer leg members 21, 25 of the lower loops 20, 24, respectively, outwardly against opposing walls of the panel opening 1 at the same time that the leg members 28 are bent outwardly over the ends of said spaced points 32, as aforesaid.

With the fastener initially applied and the tool T fitted thereto as shown in Fig. 3, the fastener is anchored in the panel opening 1 by a suitable force on said tool T which deforms the fastener in secured relation in the panel opening substantially as shown in Fig. 4. The action is such that the upper portion of the intermediate loop 27 is driven downwardly until the apex 29 thereof is adjacent to or substantialy in the plane of the head sections 11 while the lower portions of the legs 28 thereof bend outwardly over the ends of the spaced points 32 of the tool T. The outward bending of the legs 28 is such as to cause a proportionate outward bending of the outer legs 21, 25, of the lower loops 20, 24, over the lower corner edges of the panel opening 1 in a manner whereby said outer legs 21, 25, are formed with pronounced shoulders 22, 26, respectively, which anchor the fastener in secured position in the panel opening A.

At the same time that said shoulders 22, 26 are formed on the outer legs 21, 24, respectively, the adjacent side faces of the tool points 32 wedge said leg members 21, 25, against opposing wall portions of the panel opening 1 such that the fastener is tightly secured in the panel opening against lateral loosening or shifting. Simultaneously, the fastener is tightly secured axially by reason of the shoulders 22, 26 on the outer leg members 21, 25, which rigidly engage the lower corner edges of the panel opening 1, as aforesaid, in cooperation with the head or base 11 of the fastener seated on the upper surface of the panel A. In this regard, the driving force for securing the fastener is such as to flatten the head or base 11 of the fastener as shown in Fig. 4 from the initially arched or bowed formation thereof seen in Fig. 3, such that the head or fastener is seated under spring tension and exerts a continuously effective reverse axial drawing action on the fastener shank which adapts the fastener for a tight attachment to panels which vary in thickness or in securing two or more parts having a varying combined thickness.

From the foregoing, it will be understood that in the procedure for mounting the molding M, Fig. 5, on the panel A, as many clips or fasteners 10 as are necessary are secured in the openings 1 prepared in the panel A in aligned relation along the path the molding M extends in mounted position. The molding M is positioned over the fasteners 10 with the inturned flanges 5 thereof in engagement with the upper surfaces of the spring arms 15, 16 of the fasteners. When downward pressure is exerted on the top of the molding M, the edges of the molding flanges 5 ride on the upper surfaces of said spring arms 15, 16, to force the same inwardly toward each other as necessary for said molding flanges 5 to snap over said spring arms 15, 16 into underlapped locked relation therewith as shown in Fig. 5. This operation is in the nature of a snap fastening action which takes place as a result of the inherent resiliency of the spring arms 15, 16, and the resiliency of the inturned flanges 5 of the molding M.

Fig. 6 illustrates a clip or fastener 10a which is substantially identical in general construction and application to that described with reference to Figs. 1–5, inclusive, but which is simplified for use of the device in a wide range and variety of applications as a fastener of general utility for securing two or more parts B, C, having aligned openings defining a single work opening 2 in which the shank of the fastener is secured in the general manner described. In this regard, the ends of the head or base of the fastener 11 may terminate in the plane thereof or be provided with slightly rounded bearing surfaces 35, 36, which permit the desired securing action without damaging or marring the part B immediately adjacent the head or base 11 of the fastener.

Figs. 7–10, inclusive, show another form of molding clip or fastener 10' having the same general construction, application and use as that described with reference to Figs. 1–5, inclusive, but in which certain elements are modified for securing the fastener easily and quickly by the driving force of direct hammer blows without the use of the special tool T, Figs. 3 and 4. As best seen in Fig. 9, the fastener base 11', in normal untensioned relation, has a more decided arch or bow, and, the T-shaped tongue on the free end of the strip 13', Fig. 9, is spaced from the upper side of the head sections 11' with the extremity thereof carrying the oppositely extending lateral projections 19' bent to lie substantially parallel to the said head sections 11' in overlapping interlocked relation therewith as illustrated in Figs. 7 and 9.

The fastener 10' is initially applied to the panel opening 1 as seen in Fig. 9, and a suitable driving force by ordinary hammer blows is directed on the apex 29' of the intermediate inverted U-shaped loop 27'. The hammer blows drive the intermediate loop portion 27' downwardly to a position in which the apex 29' thereof is adjacent to or substantialy in the plane of the head sections 11'. The action is such that the surfaces of the lateral projections 19' on the T-shaped extremity 18' first descend into bearing engagement with the adjacent surface portions of the spaced head sections 11', and, upon further driving, said intermediate loop 27' is deformed as seen in Fig. 10 and tilts toward the outer leg member 25' on the free end of the strip 13'.

At the same time, said leg member 25' moves downwardly against the adjacent wall of the panel opening 1 with the flat lateral projections 19' on the extremity thereof sliding inwardly on the head sections 11' such that said leg member 25 is forced inwardly toward said loop 27'. The leg member 25' and tilted loop member 27' thus move toward each other until they are in abutting relation and cannot move further toward each other. The legs 28' of the intermediate loop 27' thereupon necessarily move downwardly under the driving force and cause an outward bending of the outer legs 21', 25' of the lower loops 20', 24', respectively over the lower corner edges of the panel opening 1, thereby forming the pronounced shoulders 22', 26' on said outer legs 21', 25' which secure and anchor the fastener in said panel opening 1. In the final secured position of the fastener 10', the base 11' has an arched or bowed formation which serves to exert a continuously effective axial drawing action on the shank of the fastener in a manner which causes the pronounced shoulders 22', 26' to seat tightly and rigidly against the engaged lower edge portions of the panel opening 1 at all times. This prevents any axial loosening of the fastener, while lateral loosening thereof is prevented by the abutting relation of the deformed intermediate loop 27' against the outer leg member 25' which cooperates with the outer leg member 21' in engaging opposite wall portions of the panel opening 1 to retain the fastener against lateral loosening or shifting in its final applied position.

Fig. 11 illustrates a clip or fastener 10b similar to that of Figs. 7-10, inclusive, as provided in a fastener of general utility for securing two or more parts B, C, having aligned openings defining a work opening 2 in which the fastener is applied to retain said parts in secured relation, substantially as described with reference to Fig. 6. This form of the fastener, likewise, may be provided with its ends terminating in the plane of the fastener base or provided with rounded bearing surfaces 35', 36', which permit the desired securing action in the work opening 2 without damaging or marring the part B immediately adjacent the head or base 11' of the fastener.

The clip or fastener in any form is constructed of relatively thin sheet metal the thickness of which is selected according to service requirements and the predetermined size of the part or parts to be secured. The clip or fastener is most effective when provided of spring metal suitably spring tempered and otherwise treated to give the desired toughness and hardness. A cheap and highly effective clip may be provided from cold rolled metal such as cold rolled steel which is untempered but of a spring metal nature and capable of providing an effective and reliable fastening device as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A fastener comprising a piece of sheet metal having a slot and providing a base comprising a pair of spaced head sections extending in the same general direction, a strip in the space between said spaced head sections having an integral junction with said base between said spaced head sections, said strip being bent into a W-shaped formation comprising a portion of said strip adjacent said junction bent to provide a downward deformable V-shaped loop projecting from the underside of said base with the legs of said downward loop extending in spaced diverging relation toward said base, said downward loop continuing upwardly through said slot in the base into an upper inverted V-shaped loop projecting upwardly from the upper side of said base with the legs of said upper loop diverging toward said base, said upper loop continuing downwardly through said slot in the base into a second downward deformable loop projecting from the underside of said base with the legs thereof extending in spaced diverging relation toward said base, said second downward loop continuing into a portion extending upwardly through said slot in said base and having a projection at the upper side of said base in overlapping abutting relation to said base adjacent said slot, said downward loops being deformable into permanently anchored relation in an opening in a supporting part by inward force on said upper loop.

2. A fastener comprising a piece of sheet metal having a slot and providing a base comprising a pair of spaced head sections extending in the same general direction, a strip in the space between said spaced head sections having an integral junction with said base between said spaced head sections, said strip being bent into a W-shaped formation comprising a portion of said strip adjacent said junction bent to provide a downward deformable V-shaped loop projecting from the underside of said base with the legs of said downward loop extending in spaced diverging relation toward said base, said downward loop continuing upwardly through said slot in the base into an upper inverted V-shaped loop projecting upwardly from the upper side of said base with the legs of said upper loop diverging toward said base, said upper loop continuing downwardly through said slot in the base into a second downward deformable loop projecting from the underside of said base with the legs thereof extending in spaced diverging relation toward said base, said second downward loop continuing into a portion extending upwardly through said slot in said base and having a T-shaped portion providing a pair of oppositely extending projections at the upper side of said base in overlapping abutting relation to portions of said base at opposite sides of said slot, said downward loops being deformable into permanently anchored relation in an opening in a supporting part by inward force on said upper loop.

LAURENCE H. FLORA.

References Cited in the file of this patent

UNITED STATES PATENTS

| Number | Name | Date |
|---|---|---|
| 2,265,957 | Tinnerman | Dec. 9, 1941 |
| 2,451,591 | Tinnerman | Oct. 19, 1948 |
| 2,520,725 | Judd | Aug. 29, 1950 |
| 2,527,124 | Flora | Oct. 24, 1950 |
| 2,539,367 | Greenberg | Jan. 23, 1951 |
| 2,559,293 | Gadomski | July 3, 1951 |
| 2,567,903 | Bedford | Sept. 11, 1951 |